(12) United States Patent
Jacquemart

(10) Patent No.: US 11,449,051 B2
(45) Date of Patent: Sep. 20, 2022

(54) METHOD FOR MANAGING MOVEMENTS OF A FLEET OF AUTONOMOUS MOBILE OBJECTS, METHOD FOR MOVEMENT OF AN AUTONOMOUS MOBILE OBJECT, CORRESPONDING DEVICES AND COMPUTER PROGRAM PRODUCTS

(71) Applicant: IFOLLOW, Meudon (FR)

(72) Inventor: Vincent Jacquemart, Meudon (FR)

(73) Assignee: IFOLLOW, Meudon (FR)

( * ) Notice: Subject to any disclaimer, the term of this patent is extended or adjusted under 35 U.S.C. 154(b) by 360 days.

(21) Appl. No.: 16/300,940

(22) PCT Filed: May 9, 2017

(86) PCT No.: PCT/EP2017/061041
§ 371 (c)(1),
(2) Date: Nov. 12, 2018

(87) PCT Pub. No.: WO2017/194532
PCT Pub. Date: Nov. 16, 2017

(65) Prior Publication Data
US 2019/0187698 A1    Jun. 20, 2019

(30) Foreign Application Priority Data

May 10, 2016  (FR) ...................................... 1654163

(51) Int. Cl.
*G05D 1/00*          (2006.01)
*G05D 1/02*          (2020.01)

(52) U.S. Cl.
CPC ......... *G05D 1/0027* (2013.01); *G05D 1/0022* (2013.01); *G05D 1/0088* (2013.01);
(Continued)

(58) Field of Classification Search
None
See application file for complete search history.

(56) References Cited

U.S. PATENT DOCUMENTS 9,310,802 B1 *   4/2016   Elkins ................... G05D 1/0027
9,393,981 B1 *   7/2016   Lee ....................... G05D 1/0255
(Continued)

FOREIGN PATENT DOCUMENTS

CN        106297083 A  *  1/2017  ............... G05D 1/02
EP          2990901 A1  *  3/2016  ........... B62B 5/0063
(Continued)

OTHER PUBLICATIONS

International Search Report dated Jul. 18, 2017, for corresponding International Application No. PCT/EP2017/061041, filed May 9, 2017.
(Continued)

*Primary Examiner* — Peter D Nolan
*Assistant Examiner* — Michael F Whalen
(74) *Attorney, Agent, or Firm* — David D. Brush; Westman, Champlin & Koehler, P.A.

(57) ABSTRACT

A method for managing movements of a fleet of a plurality of autonomous mobile objects capable of communicating with a management server. An autonomous mobile object is associated with a user terminal with which a user is equipped. The management server performs the following steps, for a given autonomous mobile object, referred to as a first object, associated with a first user terminal with which a user is equipped: obtaining information representing a position to be reached by the first object, referred to as first object destination information; determining information representing a movement to be made by the first object, referred to as first object movement information, the determining taking into account of at least the first object destination information; and transmitting the first object movement information to the first object.

10 Claims, 2 Drawing Sheets

(52) U.S. Cl.
CPC ........... *G05D 1/028* (2013.01); *G05D 1/0289* (2013.01); *G05D 1/0291* (2013.01); *G05D 2201/0216* (2013.01)

(56) References Cited

U.S. PATENT DOCUMENTS

| | | | | |
|---|---|---|---|---|
| 9,643,638 | B1* | 5/2017 | Wittliff, III | B62B 5/0033 |
| 10,528,996 | B2* | 1/2020 | Clark | G06K 9/00624 |
| 10,540,700 | B1* | 1/2020 | Chilukuri | H04N 5/2253 |
| 10,613,533 | B1* | 4/2020 | Payson | G06Q 10/087 |
| 10,723,070 | B2* | 7/2020 | Herzog | B33Y 10/00 |
| 2006/0106496 | A1* | 5/2006 | Okamoto | G05D 1/0278 700/253 |
| 2013/0098700 | A1* | 4/2013 | Zhang | G05D 1/0255 180/167 |
| 2014/0249693 | A1 | 9/2014 | Stark et al. | |
| 2015/0199619 | A1* | 7/2015 | Ichinose | G01C 21/3469 705/5 |
| 2016/0059875 | A1* | 3/2016 | Segman | G05D 1/0278 701/24 |
| 2016/0364786 | A1* | 12/2016 | Wankhede | G07G 1/14 |
| 2017/0003682 | A1* | 1/2017 | Segman | B62B 5/0033 |
| 2017/0293294 | A1* | 10/2017 | Atchley | B62K 11/007 |
| 2018/0025460 | A1* | 1/2018 | Watanabe | G06Q 10/063112 705/28 |
| 2018/0096299 | A1* | 4/2018 | Jarvis | G01C 21/206 |
| 2018/0173223 | A1* | 6/2018 | Doane | G01C 21/20 |
| 2018/0222338 | A1* | 8/2018 | Sponheimer | B60L 53/60 |
| 2019/0227551 | A1* | 7/2019 | Igata | G06Q 10/0836 |
| 2019/0377353 | A1* | 12/2019 | Murai | G05D 1/024 |
| 2019/0377357 | A1* | 12/2019 | Lee | G05D 1/0253 |
| 2020/0023764 | A1* | 1/2020 | Keiser | B60P 1/6409 |
| 2020/0031380 | A1* | 1/2020 | Kadiyala | B62B 5/0069 |
| 2020/0081437 | A1* | 3/2020 | Nakashima | B60W 30/0956 |
| 2020/0081440 | A1* | 3/2020 | Suzuki | G05D 1/0255 |
| 2020/0108851 | A1* | 4/2020 | Hagen | B62B 3/1464 |
| 2020/0118222 | A1* | 4/2020 | Bidram | G06Q 10/06393 |
| 2020/0174497 | A1* | 6/2020 | Cheon | G05D 1/0061 |
| 2020/0198680 | A1* | 6/2020 | Hagen | B62B 5/0096 |
| 2020/0254895 | A1* | 8/2020 | Kim | B60L 53/16 |
| 2020/0346352 | A1* | 11/2020 | Kim | B25J 19/023 |
| 2020/0346679 | A1* | 11/2020 | Kim | B62B 5/0043 |
| 2020/0393831 | A1* | 12/2020 | Kim | G05D 1/0223 |

FOREIGN PATENT DOCUMENTS

| | | | |
|---|---|---|---|
| JP | 3009395 | B1 | 2/2000 |
| JP | 2008145383 | A * | 6/2008 |
| KR | 20160011390 | A | 2/2016 |
| KR | 20160020454 | A | 2/2016 |

OTHER PUBLICATIONS

Written Opinion of the International Searching Authority dated Jul. 18, 2017, for corresponding International Application No. PCT/EP2017/061041, filed May 9, 2017.
International Preliminary Report on Patentability dated Dec. 18, 2017, for corresponding International Application No. PCT/EP2017/061041, filed May 9, 2017.
English Translation of International Preliminary Report on Patentability dated Dec. 18, 2017, for corresponding International Application No. PCT/EP2017/061041, filed May 9, 2017.

* cited by examiner

METHOD FOR MANAGING MOVEMENTS OF A FLEET OF AUTONOMOUS MOBILE OBJECTS, METHOD FOR MOVEMENT OF AN AUTONOMOUS MOBILE OBJECT, CORRESPONDING DEVICES AND COMPUTER PROGRAM PRODUCTS

CROSS-REFERENCE TO RELATED APPLICATIONS

This Application is a Section 371 National Stage Application of International Application No. PCT/EP2017/061041, filed May 9, 2017, which is incorporated by reference in its entirety and published as WO 2017/194532 A1 on Nov. 16, 2017, not in English.

TECHNICAL FIELD

The field of the invention is that of autonomous mobile objects (in other words objects capable of moving by themselves in a given environment), configured to move on the ground, for example by rolling.

More precisely, the invention concerns a method for managing the movements of autonomous mobile objects belonging to a fleet of such objects, a user equipped with a terminal being associated with at least one autonomous mobile object of the fleet in question, as well as the corresponding method of movement of an autonomous mobile object of such a fleet.

Due to the increasing number of envisaged applications using autonomous mobile objects, the invention has many applications, in particular, but not exclusively, in the field of transport trolleys, for example luggage trolleys at a station or an airport, or shopping trolleys in a large supermarket-type store, or again in the field of workshop trolleys used in a production plant, or even in the field of luggage such as autonomous mobile suitcases.

TECHNICAL BACKGROUND

Autonomous mobile objects are known in various fields. Examples include:
  the "CaddyTrek" golf caddy which is already marketed on certain specialised sites;
  the autonomous suitcase unveiled by the Israeli company NUA Robotics; or again
  the autonomous shopping trolley developed by Texan company Chaotic Moon and intended to equip large supermarket-type stores.

All these known autonomous mobile objects are intended to follow a given user. To do this, a common technique involves basing this following on the quality of reception by the follower object (i.e. the golf caddy, suitcase or shopping trolley, in the examples cited above) of a signal transmitted by the user, for example a radiofrequency signal transmitted by a beacon with which the user is equipped. Various criteria can then be envisaged for triangulating the signal received by the follower object, for example on the basis of a received signal level, or a difference in time of arrival. The follower object estimates both the direction in which the user is located as well as the distance at which the latter is to be found. It can then utilise movement means in order to move closer to the user.

For the most sophisticated autonomous mobile objects, ancillary means are also provided to manage their movement while avoiding collisions. For example, cameras able to develop depth maps are sometimes provided to allow the mobile object to detect the position of potential obstacles which are not equipped with transmitting beacons, unlike the users, with the aim of being able to modify their trajectory accordingly.

However, a major disadvantage of these known techniques resides in the limitation of the movements authorised for the mobile object in question, which, by design, only seeks to follow the user.

Furthermore, these known techniques are dedicated to the following of a given user by a particular autonomous mobile object. Consequently, they do not enable an optimised management of the movements of a plurality of autonomous mobile objects belonging to a fleet of such objects, as is the case for example for a fleet of luggage trolleys in a station or airport, or shopping trolleys in a supermarket.

There is thus a need for a method of optimised management of movements of autonomous mobile objects belonging to a fleet of such objects.

There is also a need for such a method to offer a greater flexibility in the movements of the autonomous mobile objects of the fleet.

Finally, there is a need for such a method to lead to a global solution at a controlled cost.

SUMMARY

A method is proposed for managing movements of a fleet of a plurality of autonomous mobile objects configured to move on the ground and capable of communicating with a management server, an autonomous mobile object being associated with a user terminal with which a user is equipped.

According to an embodiment of the invention, the management server performs the following steps, for a given autonomous mobile object, referred to as first object, associated with a first user terminal with which a first user is equipped:
  obtaining information representing a position to be reached by the first object, referred to as first object destination information;
  determining information representing a movement to be made by the first object, referred to as first object movement information, the determination taking into account at least the first object destination information;
  and transmitting the first object movement information to the first object.

Thus, the invention proposes a novel and inventive solution for managing movements of autonomous mobile objects configured to move on the ground (for example rolling autonomous mobile objects such as shopping trolleys, luggage trolleys, workshop trolleys or luggage), belonging to a fleet of such objects associated with users equipped with terminals.

To achieve this, the claimed method proposes managing the movements of objects of the fleet in a centralised manner via a management server. More particularly, the server determines movement information of an autonomous mobile object on the basis of destination information, then transmits this movement information to the autonomous mobile object in question, thus allowing a greater flexibility with respect to the possible destinations of the autonomous mobile object in question.

Furthermore, this centralised approach allows a more reactive and optimised management of the movements of autonomous mobile objects of the fleet, in particular through the possibility of taking into account a greater quantity of information available to a centralised server, such as knowledge of the geographical area in which the fleet of autonomous mobile objects moves.

Finally, the determination of the paths and speeds benefits from having determination means which can be larger, because they are common to the assembly of autonomous mobile objects of the fleet, than that which could be envisaged for equipping a single autonomous mobile object at a reasonable cost. The cost of the overall solution is thus optimised For example, the first object destination information belongs to the group comprising:
  information representing the position of the first user terminal, referred to as first user position information;
  information representing the position of an article or an area of interest for the first user; and
  information representing a position resulting from the response to a challenge transmitted to said first user.

Thus, the claimed method enables control of movements of objects of the fleet according to different types of destinations.

In an embodiment, the destination information of an autonomous mobile object corresponds to the position of the user associated with it, this position of the user being accessible via the geolocation of a terminal with which this user is equipped. The autonomous mobile object is thus able to follow this user.

In another embodiment, the destination information of an autonomous mobile object corresponds to a predetermined position, resulting for example from a choice of destination made by the user associated with this object via his user terminal (for example, in response to a challenge or a question). In this case, the management server transmits, to the autonomous mobile object in question, movement information corresponding to the predetermined position in order for the autonomous mobile object to go there. Thus, in this embodiment, the autonomous mobile object guides the user to the predetermined position.

According to one particular feature of the invention, the step of determining the first object movement information also takes into account at least one piece of information representing the position of a second user terminal with which a second user associated with a second autonomous mobile object of the fleet is equipped, referred to as second user position information, and/or information representing the position of the second autonomous mobile object, referred to as second object position information.

Thus, in order to determine the movement information of a given autonomous mobile object, taking into account the position of other autonomous mobile objects of the fleet and/or the position of the corresponding users (via their terminals), makes it possible to optimise the trajectories of the various autonomous mobile objects of the fleet while making them secure, for example by anticipating possible crossings of trajectories and thus the potential collisions between autonomous mobile objects and/or users.

For example, the first user position information or the second user position information or the second object position information belong to the group comprising:
  the position of the first user or of the second user or of the second object;
  the data enabling the position of the first user or of the second user or of the second object to be determined.

Thus, in an embodiment, the management server directly receives the positions of the users and/or of the autonomous mobile objects, thus making it possible to rely on an already existing and proven geolocation infrastructure. In a second embodiment, the management server receives data making it possible to determine the positions of the users and/or of the autonomous mobile objects, thus leading to an optimisation of resources as well as a greater flexibility in the implementation of the determination of the positions in question for the targeted application.

For example, the first object movement information belongs to the group comprising:
  a displacement movement to be made by the first object;
  the first object destination information.

In this way, in an embodiment, the management server transmits, directly to the autonomous mobile object, information concerning the movement that it has to make, thus allowing the determination of this movement to rely on the information centralised by the management server as well as on the computing power thereof.

In another embodiment, the management server transmits, to an autonomous mobile object, the destination that it must arrive at and said autonomous mobile object then determines the movements to be carried out in order to arrive there. This allows the management server to offload a part of its calculation load by allowing the mobile object complete autonomy, despite more limited resources, for example when the destination in question is in a little-frequented area with a more limited associated risk, for example of collision.

According to a particular aspect of the invention, according to which the first object is also capable of detecting obstacles, the management server also performs a step of receiving information representing the detection of at least one obstacle by the first object and the determination of first object movement information also takes into account the detection of the at least one obstacle.

Thus, in this embodiment, the autonomous mobile objects of the fleet are also capable of detecting fixed or mobile obstacles situated around them and communicating this information to the management server.

These obstacles can correspond to objects which are not known a priori to the management server (because they are not part of the known geography of the location, or do not correspond to users or autonomous mobile objects referenced in the fleet) and taking them into account for the determination of movement information of a given autonomous mobile object makes it possible to optimise and secure the trajectories and speeds of the various autonomous mobile objects of the fleet, for example by anticipating potential collisions with these detected obstacles.

According to a particular feature of the invention, the management server also performs a step of transmitting operational information to the first object and/or to the first user terminal, the operational information belonging to the group comprising:
  a commercial offer on a product located in the vicinity of the first user;
  information of interest for the first user linked with an associated profile;
  an alert associated with an event occurring in the vicinity of the first user.

Hence, the management server can use its knowledge of the position of the user and/or of the autonomous mobile object in order to transmit to it various information such as commercial offers, allowing him to be informed of current promotions, information of interest linked with his profile (reminder of voyage option preferences before embarking, offers on preferred products, etc.), alerts concerning an unexpected occurrence of any event in the vicinity of the trajectory that he must follow.

The invention also concerns a method for moving an autonomous mobile object, comprising the steps of:
- receiving information on movement to be made;
- movement of the autonomous mobile object, the movement taking into account the information on movement to be made;

and the information on movement to be made corresponds to a first object movement information obtained by implementing a method for managing movements of a fleet of at least one autonomous mobile object such as described above, by the management server.

The invention also concerns a computer program product, comprising program code instructions for implementing a method for managing movements of a fleet of a plurality of mobile objects and/or a method for moving a mobile object such as described above, when said program is executed by a processor.

The invention also concerns a server for managing movements of a fleet of a plurality of autonomous mobile objects capable of communicating with a management server, an autonomous mobile object being associated with a user terminal with which a user is equipped, comprising
- means for obtaining at least one piece of information representing a position to be reached by a first autonomous mobile object of the fleet, referred to as first object destination information;
- means for determining information representing a movement to be made by the first autonomous mobile object, referred to as first object movement information, the determination means being capable of taking into account at least the first object destination information;
- means for transmitting the first object movement information to the first autonomous mobile object.

Such a movement management server is, in particular, suitable for implementing the method for managing movements, such as described above.

The invention also concerns an autonomous mobile object configured to move on the ground, comprising:
- means for receiving information on movement to be made;
- means for moving the autonomous mobile object, and means for taking into account the information on movement to be made;
- means for communicating, with a management server as described above, the information on movement to be made corresponding to the first object movement information determined by the determination means.

Such a mobile object configured to move on the ground is, for example, a rolling mobile object such as a shopping trolley, luggage trolley, autonomous mobile luggage (for example a suitcase), or again a workshop trolley (such as are found on assembly lines of a production plant).

LIST OF FIGURES

Other features and advantages of the invention will become apparent on reading the following description, given by way of illustration and not being limiting, and the appended drawings, in which.

DETAILED DESCRIPTION OF THE INVENTION

In all the figures of this document, identical elements and steps are designated by the same reference sign.

The general principle of the technique described consists of obtaining, by a server for managing movements of autonomous mobile objects belonging to a fleet of such objects, information representing a position to be reached for one of the objects of the fleet. In this way, the management server can determine information representing a movement to be made by the object in question and then transmit this information to the object in question.

Figure 1:
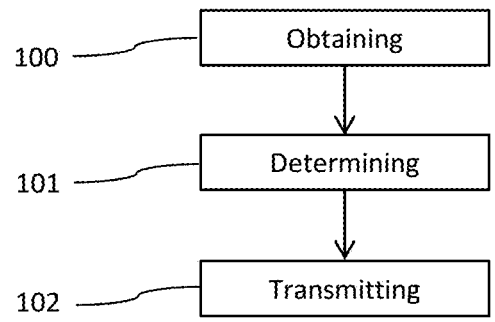
FIG. 1 illustrates the steps of a method for managing movements of autonomous mobile objects in a fleet of such objects.
Figure 2:
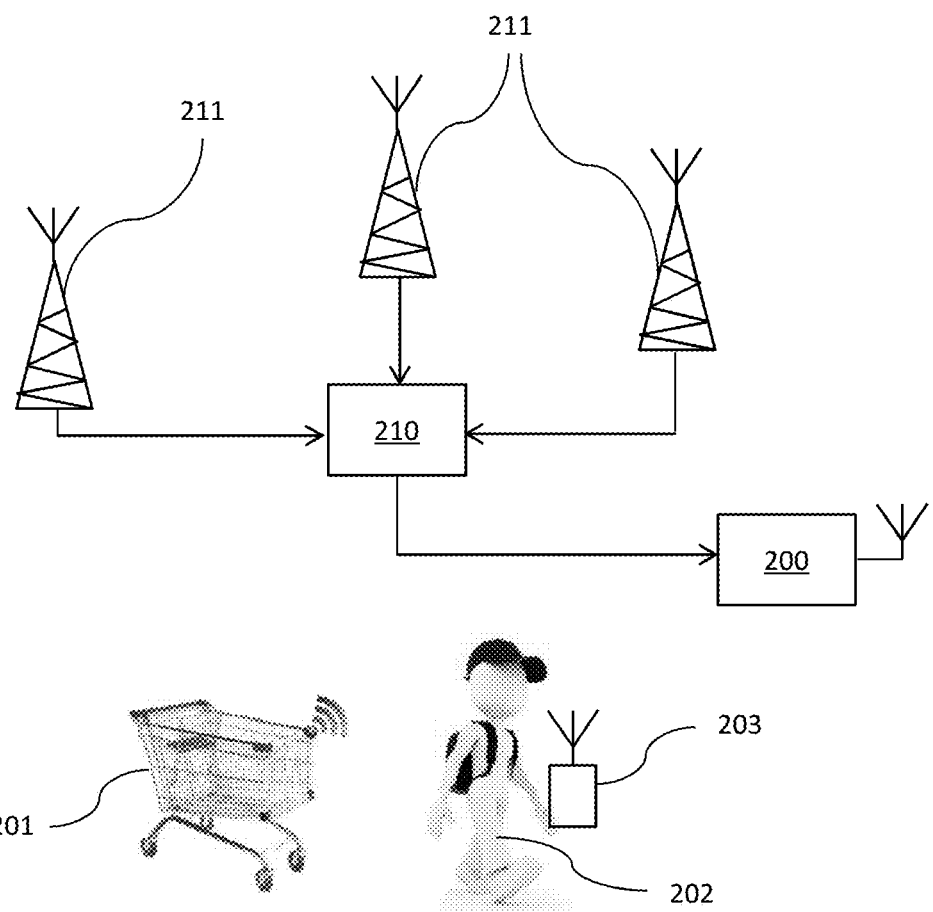
FIG. 2 illustrates a system for managing movements of autonomous mobile objects in a fleet of such objects, according to an embodiment of the invention.

Described below, in relation to FIGS. 1 and 2, is a technique for managing movements of autonomous mobile objects, configured to move on the ground (for example by rolling between a given starting point and a given arrival point, and/or by following a given trajectory on the ground), in a fleet of such objects according to various embodiments of the invention.

During a step 100, a management server 200 for managing movements of autonomous mobile objects configured to move on the ground (for example, rolling autonomous mobile objects such as shopping trolleys, baggage trolleys, workshop trolleys or luggage), belonging to a fleet of such objects, obtain information representing a position to be reached, referred to as destination information, by an autonomous mobile object 201 of the fleet in question, a user 202 equipped with a terminal 203 being associated with the autonomous mobile object 201.

In the embodiment illustrated in FIG. 2, the autonomous mobile object 201 is a shopping trolley such as can be found, for example, in a large supermarket-type store. In variants, it can also concern a luggage trolley, or even directly concern an item of autonomous mobile luggage, for example a suitcase, among a plurality of luggage of the same type, such as can be found in a station or an airport, or again a workshop trolley such as is found on assembly lines of a production plant.

In an embodiment, the terminal 203 is able to communicate with the management server 200 via a radiofrequency link, for example a Bluetooth, WiFi or mobile phone link (2G, 3G, 4G . . . ) or any equivalent radiofrequency link. In a variant, the information representing a position to be reached corresponds to a position resulting from a challenge (or a question) submitted by the management server 200 to the user 202 via the terminal 203, for example the choice of a trajectory among a plurality of possible trajectories, or even the selection of an article. In other variants, the information representing a position to be reached corresponds, for example, to a boarding area to which the user 202 should go.

In another embodiment, the terminal 203 can be geolocated and the information representing a position to be reached corresponds to a position of the user 202 equipped with the terminal 203.

In one variant, the terminal 203 determines its own position via an embedded GPS geolocation technology, or any equivalent so-called GNSS (Global Navigation Satellite System) technique. These techniques are affordable at a low cost due to their wide dissemination amongst the general public, but remain particularly suitable for geolocation outside of buildings, the satellites needing to be in clear view of the receiver for a correct operation. The position of the terminal 203 determined in this way is then transmitted to the management server 200 with which the terminal 203 is capable of communicating.

In other variants, the position of the terminal 203 is determined via a geolocation server 210 based on an RTLS (Real-time locating systems) technique which can be deployed equally well inside and outside of buildings. This may involve a positioning determined by triangulation, for example based on a level of radiofrequency signal received by antennas 211 of the RTL system considered, or even on the basis of an arrival time at the same antennas 211. The received radiofrequency signalling in question can be, for example a Bluetooth signal, a WiFi signal, a mobile phone signal (2G, 3G, 4G . . . ) for any equivalent radiofrequency signal. In a variant, the geolocation server 210 itself determines the position of the terminal 203 and then transmits this to the management server 200 with which it is capable of communicating, thus enabling this geolocation to be based entirely on a dedicated proven technology. In another variant, the geolocation server 210 transmits, to the management server 200, the information gathered by the RTLS system and the management server 200 then itself determines the position of the terminal 203, thereby offering greater flexibility in the implementation of the determination of the position for the targeted application.

During a step 101, the management server 200 determines information representing a movement on the ground, referred to as movement information, to be carried out by the autonomous mobile object 201 on the basis of the destination information obtained during step 100.

In an embodiment, the movement information corresponds to a displacement movement on the ground to be carried out by the autonomous mobile object 201. Thus, in this embodiment, the management server 200 itself determines entirely the movements on the ground of the autonomous mobile object 201, thus enabling the determination of this movement to be based on the information centralised by the management server (for example, based on knowledge of the movement location, such as the arrangement of aisles in a supermarket), as well as on its computing power.

In another embodiment, the movement information corresponds to the destination information obtained during step 100. Hence, in this embodiment, the autonomous mobile object 201 itself determines the movements to be made in order to go to the position to be reached, thus enabling the management server to offload a part of its calculation load by allowing the mobile object complete autonomy. This can be, for example, when the destination in question is in a little-frequented area with a more limited risk of collision.

In an embodiment, the management server 200 determines the movement information by taking account of the position of other autonomous mobile objects of the fleet and/or the position of other users of autonomous mobile objects equipped with terminals. Hence, the management server 200 is capable of optimising the trajectory and the speed of the autonomous mobile object 201 by taking into account the trajectory of other autonomous moving objects of the fleet, as well as the position of the associated users. The optimisation of movements is therefore global and the risk of collision minimal.

In a variant, the terminals equipping the other users can be geolocated following one of the techniques described above in relation to step 100.

In another variant, the autonomous mobile objects of the fleet can also be geolocated following one of the techniques described above in relation to step 100. Hence, even though the management server 200 knows the theoretical position of the autonomous mobile objects of the fleet, since it is this server that transmits to them the information representing the position to be reached, feedback for updating the position of the autonomous mobile objects of the fleet on the basis of their actual position is possible on the management server 200, so as to optimise and secure the management of the various trajectories which need to be determined.

Thus, in an embodiment, the autonomous mobile object 201 and the terminal 203 can both be geolocated and are both capable of exchanging their respective position, for example via a radiofrequency link which can be, for example a Bluetooth signal, a WiFi signal, a mobile phone signal (2G, 3G, 4G . . . ) or any equivalent radiofrequency signal. Hence, even though the management server 200 manages the movements on the ground of the autonomous mobile objects of the fleet, direct feedback between the autonomous mobile object 201 and the user 202 via the terminal 203 is possible so as to secure the movements, for example in the case of a break in communication between the management server 200 and the autonomous mobile object 201 and/or the terminal 203.

In another embodiment, the autonomous mobile objects of the fleet are also capable of detecting fixed or mobile obstacles situated around them and communicating this information to the management server 200. Hence, the management server 200 is capable of optimising and securing the trajectory and the speed of the autonomous mobile objects of the fleet as a function of these additional obstacles. The management server 200 is therefore more particularly capable of optimising and securing the trajectory and the speed of the autonomous mobile object 201 taking account of the presence of additional obstacles situated in the vicinity thereof.

In another embodiment, the autonomous mobile object 201 itself takes account of the obstacles which it has detected in order to optimise its trajectory, be it in the variant where it determines its movement entirely on the basis of the destination information obtained during step 100, or in the variant where it is the management server 200 which transmits the displacement movement during step 100 directly to it. In the latter case, even though the management server 200 determines the displacement movement of the autonomous mobile object 201, the latter can react rapidly in case of imminent risk of collision, for example.

During step 102, the management server transmits the movement information obtained during step 101, to the autonomous mobile object 201.

In an embodiment, the autonomous mobile object 201 is capable of communicating with the management server 200 via a radiofrequency link, for example a Bluetooth, WiFi or mobile phone link (2G, 3G, 4G . . . ) or any equivalent radiofrequency link.

In the embodiment described in relation to step 100 where the destination information corresponds to a position of the user 202 equipped with the terminal 203, the movement of the autonomous mobile object 201 in accordance with the movement information received from the management server 200 then corresponds to a "follower" operation, the autonomous mobile object 201 effectively following the user 202 equipped with the terminal 203.

Alternatively, in the embodiment where the destination information corresponds to the result of a challenge submitted by the management server 200 to the user 202 via the terminal 203, or to an area to which the user 202 must go, the autonomous mobile object 201 moves to the position to be reached independently of the relative position of the user 202. The user 202 can then be guided by the autonomous mobile object 201 to the area and/or the object of his choice or of interest.

In an embodiment, the management server 200 additionally sends operational information to the autonomous mobile object 201 and/or to the terminal 203. In the variants, the operational information corresponds to a commercial offer on a product located in the vicinity of the user 202, to an alert associated with an event occurring in the vicinity of the user 202, or to any other information of interest for the user 202. Hence, the management server 200 takes advantage of its capacity to communicate with the autonomous mobile objects of the fleet and/or with the terminals with which the users are equipped, as well as its knowledge of their positions in order to broadcast operational information of interest. In variants, the management server 200 has available to it the profile of the user 202, for example his commercial profile, so as to refine the operational information which is transmitted to him as a function of this profile. In this case, this may involve, for example, a reminder of preferred voyage options before embarking or offers on preferred products during shopping.

Figure 3:
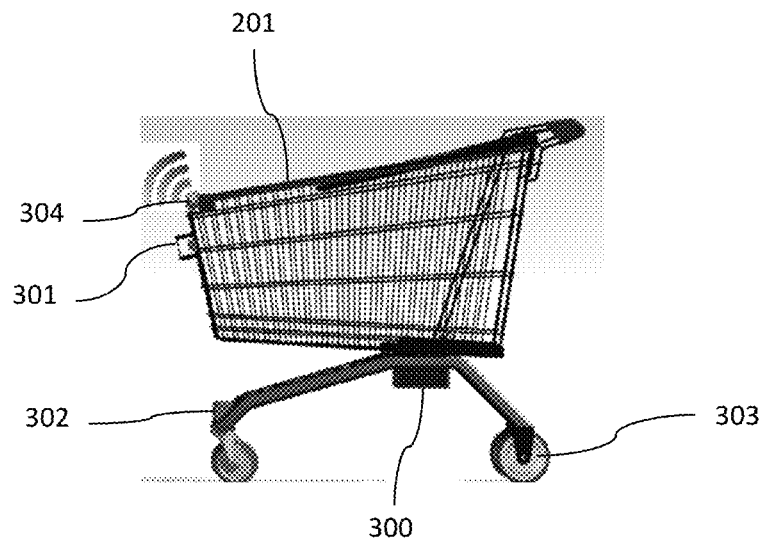
FIG. 3 illustrates an autonomous mobile object configured to move on the ground according to an embodiment of the invention.

An autonomous mobile object will now be described in relation to FIG. 3, which autonomous mobile object is configured to move on the ground according to an embodiment of the invention.

In this embodiment, the autonomous mobile object 201 is a rolling autonomous mobile object. More particularly, it involves a shopping trolley such as encountered, for example, in a large supermarket-type store.

The autonomous mobile object 201 is equipped with a communication module 304 allowing it to communicate with the management server 200. As described above, in the variants, this communication is established via a radiofrequency link, for example a Bluetooth, Wi-Fi or mobile phone link (2G, 3G, 4G . . . ) or any equivalent radiofrequency link. In certain embodiments, this same radiofrequency signal serves for geolocation of the autonomous mobile object 201 via the RTLS system composed of the geolocation server 210 and associated antennas 211, the positioning being able to be determined by triangulation, for example on the basis of a level of received radiofrequency signal or a time of arrival. In other embodiments, another radiofrequency signal is transmitted with the same goal. The communication module 304 can also include a GNSS geolocation receiver, for example a GPS receiver. The communication module 304 is then capable of transmitting the position of the autonomous mobile object 201 determined in this way, to the management server 200.

The communication module 304 is also able to communicate with an autonomy module 300 consisting of a battery and control means, for example a computer card capable of:
- implementing the communication with the management server 200 via the communication module 304,
- controlling the various modules embedded on the autonomous mobile object 201 described above,
- determining the displacement movements on the ground to be carried out on the basis of the movement information transmitted by the management server 200 during step 102, and received by radiofrequency link via the communication module 304.

Such a computer card can be, for example, an XU4 card as is available from the company Odroid. The battery should have a sufficient capacity to power the autonomous mobile object 201 for an entire day, if possible. It should not be too cumbersome for the autonomous mobile object 201 to retain one of its functionalities, which consists of storing the objects in each other, in the embodiment represented in FIG. 3. In a variant, the battery is a lithium-ion battery delivering 50 AH at 24 V.

The autonomous module 300 is also capable of controlling servomotors 302 located on the front wheels in order to pilot them. The main constraint for the servomotors 302 is to turn in a continuous and unlimited manner in the two directions of rotation. The servomotors 302 are preferably not locked when they are no longer supplied with electricity, so as to allow handling of the autonomous mobile object 201 during an electrical power failure. In a variant, the servomotors 302 are AXADD servomotors with reference RS2010MD.

In this embodiment, the autonomous module 300 also controls the gear motors 303 inside the rear wheels, the gear motors 303 enabling the autonomous mobile object 201 to be set in motion. In a variant, the gear motors 303 are Suzhou Shengyi Motor Co., Ltd. brushless motors with reference DGW10A-FA, delivering a power of 250 W.

The autonomous mobile object 201 comprises a detection module 301 that is also controlled by the autonomy module 300. The detection module 301 enables the autonomous mobile object 201 to inform itself of its immediate environment. In a variant, the detection module 301 comprises a 3D stereoscopic camera, for example a ZED camera, enabling the autonomous mobile object 201 to determine a depth map of its environment so as to detect the obstacles found there. In another variant, the detection module 301 comprises a QR (Quick Response) code reader enabling decoding of such QR codes arranged, for example, along the aisles of a large store. Such codes then enable any type of information to be given to the autonomous mobile object 201, such as positioning information for example.

In an embodiment, the autonomous mobile object 201 returns, to the management server 200, via the radiofrequency link implemented by the communication module 304, all of the data generated by the acquisition devices embedded in it, for example the data generated by the detection module 301. Thus, the management server 200 uses these additional data to optimise the determination of the movement information during step 101.

Figure 4:
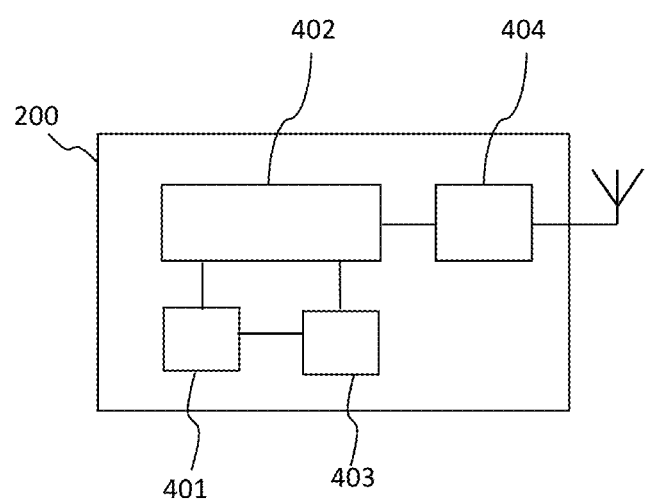
FIG. 4 shows an example of the structure of a management server according to a particular embodiment of the invention.

The structure of a management server according to a particular embodiment of the invention is now described in relation to FIG. 4.

The management server 200 comprises a radiofrequency module 404 for communicating with the communication module 304 incorporated in the autonomous mobile object 201, as well as with the terminal 203, this communication being carried out, for example, via a Bluetooth, Wi-Fi or mobile phone link (2G, 3G, 4G . . . ) or any equivalent link.

The management server 200 also comprises a read-write memory 403 (for example a RAM memory), a processing unit 402, equipped for example with a processor, and controlled by a computer program stored in a read-only memory 401 (for example a ROM memory or hard disk). At initialisation, the instructions of the computer program code are, for example, loaded into the read-write memory 403 before being executed by the processor of the processing unit 402.

FIG. 4 only illustrates one particular way, among many possible ways, of producing the algorithm detailed above in relation to FIG. 1. Indeed, the technique of the invention is performed on either a reprogrammable computing machine (a PC computer, a DSP processor or a microcontroller)

executing a program comprising a sequence of instructions, or on a dedicated computing machine (for example an assembly of logic ports such as an FPGA or an ASIC or any other hardware module).

In the case where the invention is installed on a reprogrammable computing machine, the corresponding program (in other words the sequence of instructions) may or may not be stored on a removable storage medium (such as a floppy disk, a CD-ROM or a DVD-ROM), this storage medium being partially or totally readable by a computer or a processor.

The invention claimed is:

1. A method comprising:
  managing movements of a fleet of a plurality of autonomous mobile objects configured to move on the ground and capable of communicating with a management server, at least a first of the autonomous mobile objects being associated with a first user terminal with which a first user is equipped and a second of the autonomous mobile objects being associated with a second user terminal with which a second user is equipped, wherein said management server performs the following acts, for the first autonomous mobile object:
  obtaining information representing a position to be reached by said first object, referred to as first object destination information;
  obtaining a piece of information representing:
    a position of the second user terminal with which the second user associated with the second autonomous mobile object of said fleet is equipped, referred to as second user position information, and
    a position of said second autonomous mobile object, referred to as second object position information,
    wherein said second user position information and said second object position information correspond to data enabling determination of the position of said second user and of second object respectively;
  determining information representing a movement to be made by said first object, referred to as first object movement information, said determination taking into account:
    at least said first object destination information; and
    at least said piece of information; and
  transmitting said first object movement information to said first object.

2. The method according to claim 1, wherein said first object destination information belongs to the group consisting of:
  information representing the position of the first user terminal, referred to as first user position information;
  information representing the position of an article or an area of interest for the first user;
  information representing a position resulting from the response to a challenge transmitted to said first user.

3. The method according to claim 1, wherein said first user position information corresponds to data enabling the position of the first user to be determined.

4. The method according to claim 1, wherein said first object movement information belongs to the group consisting of:
  a displacement movement to be made by the first object;
  said first object destination information.

5. The method according to claim 1, wherein the first object is also capable of detecting obstacles,
  wherein the management server also performs an act of receiving information representing detection of at least one obstacle by the first object; and
  wherein said determination of first object movement information also takes into account said information representative of the detection of said at least one obstacle.

6. The method according to claim 1, wherein the management server also performs an act of transmitting operational information to the first object and/or to the first user terminal, said operational information belonging to the group consisting of:
  a commercial offer on a product located in the vicinity of the first user;
  information of interest for the first user linked with an associated profile;
  an alert associated with an event occurring in the vicinity of the first user.

7. A method comprising:
  moving a first autonomous mobile object, referred to as a first object, of a fleet of a plurality of autonomous mobile objects configured to move on the ground and capable of communicating with a management server, the first object being associated with a first user terminal with which a first user is equipped, a second of the plurality of autonomous mobile objects being associated with a second user terminal with which a second user is equipped, the moving comprising acts of:
  receiving information on movement to be made;
  moving said autonomous mobile object, said movement taking into account said information on movement to be made; and
  wherein said information on movement to be made corresponds to a first object movement information obtained by said management server by performing the following acts:
    obtaining information representing a position to be reached by said first object, referred to as first object destination information;
    obtaining a piece of information representing:
      a position of the second user terminal with which the second user associated with the second autonomous mobile object of said fleet is equipped, referred to as second user position information, and
      a position of said second autonomous mobile object, referred to as second object position information,
      wherein said second user position information and said second object position information correspond to data enabling determination of the position of said second user and of second object respectively;
    determining the information representing the movement to be made by said first object, referred to as first object movement information, said determination taking into account:
      at least said first object destination information; and
      at least said piece of information; and
    transmitting said first object movement information to said first object.

8. A non-transitory computer-readable medium comprising instructions stored thereon, which when executed by a processor of a management server configure the management server to perform acts comprising:
  managing movements of a fleet of a plurality of autonomous mobile objects configured to move on the ground and capable of communicating with the management server, at least a first of the autonomous mobile objects being associated with a first user terminal with which a first user is equipped and a second of the autonomous mobile objects being associated with a second user terminal with which a second user is equipped, wherein managing comprises, for the first autonomous mobile object:
obtaining information representing a position to be reached by said first object, referred to as first object destination information;
obtaining a piece of information representing:
- a position of the second user terminal with which the second user associated with the second autonomous mobile object of said fleet is equipped, referred to as second user position information, and
- a position of said second autonomous mobile object, referred to as second object position information,
wherein said second user position information and said second object position information correspond to data enabling determination of the position of said second user and of second object respectively;
determining information representing a movement to be made by said first object, referred to as first object movement information, said determination taking into account:
at least said first object destination information; and
at least said piece of information; and
transmitting said first object movement information to said first object.

9. A server for managing movements of a fleet of a plurality of autonomous mobile objects configured to move on the ground and capable of communicating with a management server, at least a first of the autonomous mobile objects being associated with a first user terminal with which a first user is equipped and a second of the autonomous mobile objects being associated with a second user terminal with which a second user is equipped, wherein the server comprises:
a processor; and
a non-transitory computer-readable medium comprising instructions stored thereon, which when executed by a processor of the server configure the server to perform acts comprising:
obtaining at least one piece of information representing a position to be reached by the first autonomous mobile object of said fleet, referred to as first object destination information;
obtaining a piece of information representing:
- a position of the second user terminal with which the second user associated with the second autonomous mobile object of said fleet is equipped, referred to as second user position information, and
- a position of said second autonomous mobile object, referred to as second object position information,
wherein said second user position information and said second object position information correspond to data enabling determination of the position of said second user and of second object respectively;
determining information representing a movement to be made by said first autonomous mobile object, referred to as first object movement information, said determining taking into account:
at least said first object destination information; and
at least said piece of information; and
transmitting said first object movement information to said first autonomous mobile object.

10. A first autonomous mobile object of a fleet of a plurality of autonomous mobile objects and configured to move on the ground, the first autonomous mobile object being associated with a first user terminal with which a first user is equipped, the a plurality of autonomous mobile objects further including a second autonomous mobile object associated with a second user terminal with which a second user is equipped, the first autonomous mobile object comprising:
a processor; and
a non-transitory computer-readable medium comprising instructions stored thereon, which when executed by a processor of the first autonomous mobile object configure the first autonomous mobile object to perform acts comprising:
receiving information on movement to be made from a management server;
moving said first autonomous mobile object, and taking into account said information on movement to be made;
communicating with the management server, said information on movement to be made corresponding to first object movement information determined by the management server by:
obtaining at least one piece of information representing a position to be reached by the first autonomous mobile object, referred to as first object destination information,
obtaining a piece of information representing:
a position of the second user terminal with which the second user associated with the second autonomous mobile object of said fleet is equipped, referred to as second user position information, and
a position of said second autonomous mobile object, referred to as second object position information,
wherein said second user position information and said second object position information correspond to data enabling determination of the position of said second user and of second object respectively; and
determining the information representing the movement to be made by said first autonomous mobile object, referred to as first object movement information, said determining taking into account:
at least said first object destination information; and
at least said one piece of information.

* * * * *